United States Patent Office 3,370,400
Patented Feb. 27, 1968

3,370,400
METHOD AND COMPOSITION FOR PURIFYING WASTE GASES FROM THE GAS PHASE OXIDATION PROCESS FOR THE PRODUCTION OF PHTHALIC ANHYDRIDE
Gunthard Hoffmann and Achim Striebeck, Marl, Germany, assignors to Chemische Werke Huls A.G., Marl, Germany
No Drawing. Filed Feb. 1, 1966, Ser. No. 523,860
Claims priority, application Germany, Feb. 6, 1965, C 35,031
6 Claims. (Cl. 55—73)

The present invention relates to a process for the purification of waste gases resulting from the manufacture of phthalic anhydride by the gas phase oxidation of naphthalene and mixtures of naphthalene and o-xylene.

In the prior art processes for the production of phthalic anhydride from the gas phase oxidation of naphthalene, o-xylene, and mixture thereof, as disclosed in Kirk & Othmer's "Encyclopedia of Chemical Technology" (1953), vol. 10, pp. 584–595, 606–607, and Shreve's "Chemical Process Industries" (1945), pp. 859–861, the corrosive waste gases resulting have presented a number of problems.

It is a general object of the present invention to provide an improved and economical process for the recovery of phthalic anhydride from the gas phase oxidation of naphthalene and mixtures of naphthalene and o-xylene.

Another object of the invention is to provide for the recovery of 1,4-naphthoquinone from the process for the production of phthalic anhydride.

Another object of the invention is to provide a water wash solution for the improved recovery of 1,4-naphthoquinone by the addition of maleic acid.

A still further object of the invention is to recover 1,4-naphthoquinone from a water solution of maleic acid and 1,4-naphthoquinone by liquid-liquid extraction using a water immiscible solvent.

Still another object of the invention is to provide for the recovery of fumaric acid from the liquid-liquid extracted solution of maleic acid and water.

Phthalic anhydride is useful in the preparation of alkyd resins by the reaction with polyhydric alcohols such as glycerol and pentaerythritol. It is useful for the production of the diesters of the monohydric aliphatic alcohols such as the di(2-ethylhexyl) esters resulting in dioctyl phthalate plasticizer. Phthalic anhydride is also useful for the preparation of dyes and dye intermediates.

1,4-naphthoquinone is useful in the preparation of dyes and dye intermediates and in the preparation of 2-methyl-1,4-naphthoquinone, better known as one of the K vitamins. It is also useful in the preparation of anti-bacterial and medicinal drugs, and as a fungicide.

The physical properties and further uses of 1,4-naphthoquinone are disclosed in Kirk & Othmer's "Encyclopedia of Chemical Technology" (1953), vol. 11, pp. 418–424.

In the processes for the preparation of phthalic anhydride by the gas phase oxidation of naphthalene and mixtures of naphthalene and o-xylene, it is necessary for reasons of safety, to carry out the oxidation with a large excess of air. After the phthalic acid anhydride has been separated from the reaction gas, a considerable amount of waste gas remains. The waste gas contains in addition to about 81–82 volume percent of nitrogen, 16–17 volume percent of oxygen, 1–2 volume percent of carbon dioxide, 0–0.5 volume percent of carbon monoxide, as well as small amounts of sulfur dioxide (about 100–150 mg./150 mg./cubic meter of gas at normal conditions), and sulfur trioxide (about 15–30 mg./cubic meter of gas at normal conditions), along with varying amounts of organic substances and entrained amounts of finely divided reaction products. The organic and entrained substances present in the waste gas are mainly small quantities of phthalic anhydride, maleic anhydride, benzoic acid, and 1,4-naphthoquinone. Because of the strong corrosive properties of these substances, it is not possible to release into the atmosphere the waste gases of the naphthalene oxidation without previously carefully purifying the same.

According to the prior art, various processes have been recommended for purifying the waste gases. For example, the waste gases have been burned catalytically or thermally directly after they leave the apparatus used for condensing the phthalic anhydride. During such as oxidation process, all organic substances present in the waste gases are eliminated. Such methods are uneconomical and require a high energy expenditure for the necessary heating up of the waste gases. Depending upon the type of heating means employed in the direct oxidation process, a considerable additional charging of the atmosphere with sulfur dioxide often cannot be avoided. A further disadvantage of burning up the waste gases is that all the potentially valuable reaction products still present in the waste gas are destroyed. This makes it impossible to recover part of the considerable expenditure for this purification process by recovering these reaction products.

A water washing step is often employed for the waste gas purification. Suitable processes and apparatus are disclosed in Kirk & Othmer's "Encyclopedia of Chemical Technology," vol. 7 (1951), pp. 97–101. Power washers, for example ventilator washers, (suction washers) are preferred. With respect to the purity of the waste gases such washing systems are quite satisfactory. However, it is obvious that the water washing method only prevents the contamination of the atmosphere, while the drain water of the washing step is loaded with impurities. As a result, an indispensaable second step of this method is the purification of the drain water.

A particular and inherent disadvantage of purifying the waste gases of the napthalene oxidation by water washing resides in the poor water solubility of the 1,4-naphthoquinone present in the waste gases in varying amounts. When the water is sprayed into the waste gas, the 1,4-naphthoquinone is eliminated therefrom in the form of a solid, and not in dissolved form. As a result, not only extensive clogging of pipelines and apparatus occurs, but an imbalance is created in the apparatus and there is danger of destroying or damaging washing devices having rapidly moving parts incorporated therein. Substances which under normal circumstances are quite soluble in water, such as for example, the dicarboxylic acids, are partially prevented from being dissolved by the presence of solid 1,4-naphthoquinone. Because of this phenomenon which is probably the incrustation of the organic acids by the 1,4-naphthoquinone, the quantity of solids obtained is always considerably larger than the theoretical amount of 1,4-naphthoquinone contained in the waste gas. The elimination of such precipitates is necessary for avoiding pressure increases in the overall apparatus and pipelines. The capacity of the process is decreased by the necessity to interrupt at regular and relatively long intervals the otherwise continuously conducted naphthalene oxidation.

The cleaning operations conducted during the down period of the plant represent an annoying and also very expensive working step since only manual operations are involved. The toxicity of the 1,4-naphthoquinone makes it additionally necessary to maintain special protective measures for the personnel since it is a strong skin irritant.

A need exists for a simple method permitting the purification of the waste gases obtained during the above-mentioned oxidation process, preferably by means of a water washing step even though 1,4-naphthoquinone has poor water solubility.

According to the present invention, it has been discovered that the waste gases of the gas phase oxidation of naphthalene and mixtures of naphthalene with o-xylene can be treated with concomitant purification by washing the waste gases with an aqueous maleic acid solution, extracting the used washing solution with an organic solvent which is water immiscible, and subsequently concentrating the residual washing solution by evaporation.

The novel process of the present invention uses the surprising discovery that an aqueous maleic acid solution dissolves 1,4-naphthoquinone. The prior art water solutions without maleic acid precipitated the entrained 1,4-naphthoquinone or removed the 1,4-naphthoquinone in the form of dust from the waste gas. According to the present invention the problems resulting from precipitating solids in the washing step are avoided. According to the present invention the waste gas purifying effect of prior art water washing methods is maintained and a clear solution of 1,4-naphthoquinone in acidic water is obtained wherein the 1,4-naphthoquinone content increases with an increasing amount of maleic acid.

The aqueous solution of maleic acid which is to be used as a washing liquid can be prepared in the usual manner by dissolving maleic acid in water. It is, however, expedient and economical to begin the washing of the exhaust gases with water, and to keep the latter in closed circulation until the washing liquid has acquired the desired maleic acid concentration by washing out from the exhaust gases the maleic anhydride which is present therein only in small amounts. After this concentration has been reached, a portion of the circulating solution is then continually drawn off and replaced by fresh water.

During this process it is often necessary to filter off the solid phthalic acid which has precipitated from the maleic acid solution before returning the latter to the closed washing circuit. The fact that a washing solution produced in the manner described is also saturated with phthalic acid in addition to the maleic acid content desired for the present purposes, has been found, contrary to expectation, not to have an unfavorable influence on the ability of the washing liquid to dissolve the 1,4-naphthoquinone.

The following table demonstrates the influence of a rising content of maleic acid upon the solubility of the 1,4-naphthoquinone for a waste gas washing operation wherein water is used as the washing medium. The values have been determined at a constant temperature of 40° C. and in washing water saturated with phthalic acid at the existing conditions. The first value shows the poor solubility of 1,4-naphthoquinone in pure water.

| Maleic Acid Content (percent) | Phthalic Acid | Solubility of 1,4-naphthoquinone (mg./kg.) | Temp. (° C.) |
| --- | --- | --- | --- |
| 0 | 0 | 200 | 40 |
| 0 | Saturated | 680 | 40 |
| 1 | do | 1,260 | 40 |
| 5 | do | 1,640 | 40 |
| 10 | do | 2,800 | 40 |
| 20 | do | 5,900 | 40 |
| 30 | do | 6,800 | 40 |
| 4 | do | 7,100 | 40 |

A plot of the figures in the table shows that the washing of the waste gases of a gas phase naphthalene oxidation is suitably conducted with an aqueous maleic acid solution of more than 5%, preferably 10–40%, and particularly 15–25% maleic acid content. The dissolving power present for the 1,4-naphthoquinone having a concentration of about 0.1–0.2 g. in one cubic meter of waste gas after the phthalic anhydride condensation step is sufficient to ensure smooth and continuous operation of the waste gas purification operation.

For the washing step, conventional apparatus is suitable, for example spray towers, washing cascades, and preferably high power washing devices, for example ventilator washers or brush washers or scrubbers.

The aqueous solution obtained also contains a concentration of naphthoquinone, maleic acid, benzoic acid, and phthalic acid, permitting an economical further processing for obtaining the above-mentioned substances.

The product resulting from the washing step requires further processing. The maleic acid solution branched off from the cycle of the washing step and replaced by fresh water contains 1,4-naphthoquinone and phthalic acid and must be removed before it is optionally discharged into the waste water. The organic substances contained therein, particularly the 1,4-naphthoquinone and the maleic acid, otherwise would lead to extensive contamination of the waste water.

In the treatment of the waste water of the waste gas washing process of a gas phase oxidation of naphthalene and of naphthalene o-xylene mixtures, for example by evaporation, the strong reactivity of 1,4-naphthoquinone creates a number of problems. When such solutions are warmed, part of the 1,4-naphthoquinone is separated in the form of resins and condensation products which contaminate the heating surfaces and interfere with the operation. Since the 1,4-naphthoquinone is steam volatile, it is impossible to obtain a waste water which is non-corrosive by simply distilling the solution.

According to a further discovery of the present invention, 1,4-naphthoquinone is washed out of the waste water of the waste gas purification processes by extraction with organic solvents which are water immiscible. Suitable water immiscible organic solvents are, for example, chlorinated hydrocarbons, such as methylene chloride, chloroform, carbon tetrachloride, trichloroethylene, and hexachlorobutadiene, aromatics, such as benzene, toluene, xylene, ethyl benzene, cumene, or higher alkyl aromatics. Water immiscible organic solvents are defined for the present invention as having less than 5% water soluble therein at standard conditions. A preferred water immiscible solvent would have less than 0.5% water soluble therein at standard conditions.

The extraction can be conducted by conventional methods available for this purpose, such as disclosed in Kirk & Othmer's "Encyclopedia of Chemical Technology," (1951), vol. 6, pp. 122–139, for example by counter-current extraction in towers filled with the liquid to be washed and the extraction agent. Also possible is the treatment of the waste water with the extraction agent in vessels with high speed stirrers, and furthermore, for example, by intense mixing of both components in pump cycles. In the latter operations the separation of both phases in a separating flask or with the aid of a separator is subsequently required. As a result of the 1,4-naphthoquinone content, it is, however, necessary in most cases to conduct the extraction in several stages in counter-current flow of waste water and extraction agent. An extraction with a very small space requirement is possible by using a multi-stage extraction centrifuge wherein waste water freed from 1,4-naphthoquinone and extraction agent loaded with 1,4-naphthoquinone are obtained simultaneously.

By means of all the above-described operations, the 1,4-naphthoquinone is easily removed from the waste water to a degree below the analytical determination limit of about 5 mg./kg. waste water.

In the novel combination of washing the waste gas with aqueous maleic acid solution, on the one hand, and with the inventive extraction of the 1,4-naphthoquinone from the waste water, on the other hand, it is advantageously possible to obtain 1,4-naphthoquinone. Because of the high 1,4-naphthoquinone concentrations present in the waste water, 1,4-naphthoquinone concentration is obtained in the water immiscible solvent which makes it economically worthwhile to recover the 1,4- naphthoquinone. The 1,4-naphthoquinone is recovered for example by gentle evaporation of the organic solvent. Since the 1,4-naphthoquinone is of considerable interest as an intermediate product for organic syntheses, it is of importance to obtain the entire amount of 1,4-naphthoquinone which is still present in the waste gases of the naphthalene oxidation after the condensation of the phthalic acid anhydride, by a process which is easily carried out and is economically advantageous.

From the waste water freed from the naphthoquinone by the extraction step, all of the acids are recovered, for example by evaporation. It is also possible to convert the maleic acid solutions into fumaric acid and recover the latter because of its poor solubility. Fumaric acid may be obtained by heating the maleic acid solutions in an inert atmosphere at 145–260° C. or by boiling solutions of maleic acid in the presence of various catalysts such as thiazole, thiourea, thiazolines, thiourane, disulfide, dithiocarbamates, mercaptans, alkyl disulfides, strong neutral acids, heavy metal salts, ammonia, pyridine and primary and secondary amines. The water produced during this evaporation step as the distillate is free from interfering by-products and can be fed to the drains or sewers. Advantageously, it can be recycled as fresh water to the washing cycle of the waste gas washing process.

In order to prevent additional corrosion by concentrated sulfuric acid when the aqueous maleic acid solution freed from the 1,4-naphthoquinone is concentrated, it is recommended that the acid be neutralized, for example by previously adding the required amount of calcium and/or barium salts. The sulfuric acid present in the untreated waste gas washing liquid in amounts of 150–200 mg./kg. is an oxidation product of the organic sulfur present in the starting naphthalene and/or o-xylene, this sulfur being oxidized on the vanadium pentoxide catalyst. Without neutralization during the concentration of the waste water, the concentration of sulfuric acid can otherwise increase to values causing considerable damage to apparatus and pipelines.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example I*

36,000–38,000 cubic meters of waste gases per hour at normal conditions are conducted to a high power ventilator washer and are washed with 16–18 cubic meters per hour of recycled water. Two cubic meters of fresh water are added per hour and the same amount of recycled water is eliminated. The discharged water has an acid number of about 14–15, a maleic acid content of 1.2 to 1.5%, a phthalic acid content of 0.2 to 0.5%, and about 800–1,000 mg./kg. of 1,4-naphthoquinone, as well as 150–250 mg./kg. $SO_4$ ion. By this washing step, an odorless waste gas is obtained having no corrosive substances entering into the atmosphere. In the high power washer itself, in the wet cyclone following thereafter, in the waste gas flue, and in all waste gas pipelines, solids are precipitated. The solids content in naphthoquinone amounts to 30–40%, depending upon the manner in which the oxidation process was conducted. After about 14 days, the process is interrupted in order to mechanically clean the apparatus and pipelines of the plant wherein the waste gas washing step is carried out.

*Example II*

The prior art process of Example I is repeated with the particular variations of the present invention including the washing of the waste gases with a water solution of maleic acid.

In order to produce the aqueous maleic acid solution for conducting the waste gas washing step of the invention, the fresh water inlet is throttled to such an extent that only the amount of entrained water evaporating through the waste gas is replaced. The washing step is conducted only with cycled water until the maleic acid content of the cycled water increases to 20–25%. A filter is inserted into the washing liquid cycle to remove any precipitating solid phthalic acid before it can enter into the water injection nozzles of the high power washer. Upon exceeding a maleic acid concentration of 10%, a stream of the washing liquid is branched off at the rate of 2 m.³/hr. In a three-stage counterflow extraction centrifuge the stream is contacted with 0.2 m.³/hr. of toluene and the naphthoquinone content is decreased to below 5 mg./kg. The partial stream of the washing cycle freed from the naphthoquinone by the extraction step is recycled into the high power washer. After the desired maleic acid concentration of 20–25% is attained, the process is continued in the same manner. Fresh water is continuously added, the predetermined maleic acid concentration is maintained, and an aliquot amount of washing liquid freed from naphthoquinone is withdrawn for the process. The new waste gas washing step with the maleic acid solution of 20–25% is conducted without the problems caused by the precipitation of solids.

Before processing the naphthoquinone-free washing liquid branched off from the washing cycle, calcium oxide, calcium maleate, or calcium carbonate is added in an amount equivalent to the content in $SO_4$ ion. Thereby, before evaporation, the sulfuric acid contained in the waste water is precipitated before it reaches a concentration which can lead to corrosion of the apparatus.

The washing liquid is concentrated in a conventional circulating evaporator and is interrupted each time when the organic acids begin to crystallize as a result of the heat applied. The solution is cooled in a crystallization agitator, filtered, and the mother liquor is recycled into the circulating evaporator. The crude acids filtered off are of light brown color and can be easily processed to form pure acid crystals by conventional purification methods. It is also possible without difficulty to esterify the mixture at once and to separate the esters into their components by distillation.

The water obtained in the circulating evaporator as the distillate is unobjectionable, having a permanganate consumption of below 200 mg./l. and an organic carbon content of less than 100 mg./l., and can be discharged into the sewage. Suitably, however, it is recycled as fresh water into the high power washer. Since this water is free from salt, it offers considerable advantage for use in this washer in place of water otherwise used therein.

The waste gases suitable for treatment by the method of Example II have a general 1,4-naphthoquinone concentration of 0.01 to 2.0 grams in one cubic meter of waste gas after the phthalic anhydride condensation. Preferred results are obtained with the method of Example II when the 1,4-naphthoquinone concentration is within the range of 0.1 to 0.2 grams in one cubic meter of waste gas after the phthalic anhydride condensation.

The preferred ratio of maleic acid wash solution in liters per hour to waste gases measured in cubic meters per hour is 0.2 to 5 liters:1 cubic meter.

Although preferred results are obtained for the solution and removal of 1,4-hydroquinone by washing the waste gases with a water solution of maleic acid having a 1,4-naphthoquinone solubility in excess of about 1500 mg. per kg., the following wash solutions are also suitable: Water solutions of phthalic acid, phthalic anhydride, benzoic acid, toluic acid, phthalide and the aldehydes derived from these acids.

Preceding Example II can be repeated with similar success by substituting the generically and specifically described reactants and operating conditions of this invention for those used in preceding Example II.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the production of phthalic anhydride by the gas phase oxidation of a starting material comprising naphthalene, wherein after the phthalic anhydride product is substantially completely removed from the gas phase, a waste gas is removed, said waste gas comprising 0.01–2.0 grams of 1,4-naphthoquinone per cubic meter of said waste gas, the improvement comprising removing said 1,4-naphthoquinone from said waste gas by the step of washing said waste gas with an aqueous solution saturated with phthalic acid and containing 10–40% maleic acid based on the weight of the aqueous solution; and solvent extracting the 1,4-naphthoquinone from the resultant aqueous maleic acid solution with a water-immiscible organic solvent.

2. A process as defined by claim 1 wherein the maleic acid concentration is 15–25%.

3. A process as defined by claim 2 wherein the waste gas comprises 0.1–0.2 grams of 1,4-naphthoquinone per cubic meter.

4. A process as defined by claim 3 wherein the ratio of maleic acid wash solution to waste gas is 0.2 to 5 liters per cubic meter, respectively.

5. A process as defined by claim 4 wherein said waste gas further comprises about 100–150 mg./cubic meter of sulfur dioxide, and about 15–30 mg./cubic meter of sulfur trioxide, and comprising a further step of neutralizing resultant sulfuric acid-maleic acid aqueous solution after the solvent extraction step.

6. A process as defined by claim 1 wherein said waste gas further comprises about 100–150 mg./cubic meter of sulfur dioxide, and about 15–30 mg./cubic meter of sulfur trioxide, and comprising a further step of neutralizing resultant sulfuric acid-maleic acid aqueous solution after the solvent extraction step.

References Cited

UNITED STATES PATENTS

| | | | |
|---|---|---|---|
| 2,071,329 | 2/1937 | Brown | 260—346.7 |
| 2,071,357 | 2/1937 | Porter | 260—346.7 |
| 2,076,033 | 4/1937 | Kniskern | 260—346.7 |
| 2,455,314 | 11/1948 | Pietzsch | 55—82 X |
| 2,540,559 | 2/1951 | Welty | 260—346.7 X |
| 2,702,091 | 2/1955 | Smith | 55—82 |
| 2,783,251 | 2/1957 | Sayward | 260—346.7 |
| 2,786,805 | 3/1957 | Sullivan et al. | 55—85 X |
| 3,040,059 | 6/1962 | Hoyte | 55—85 X |

FOREIGN PATENTS

| | | |
|---|---|---|
| 415,748 | 8/1934 | Great Britain. |

OTHER REFERENCES

Fuidge, G. H., 1, G. Farbenindustdies Ludwigshafen am Rhein, Manufacturer of Phthalic Anhydride, by British Intelligence Objective Subcommittee. Available from B. 1. O. S. Information Section, 33 Bryanatan Square, London, W. I. p. 4 relied on, 1955.

REUBEN FRIEDMAN, *Primary Examiner.*

J. ADEE, *Assistant Examiner.*